C. W. SHAW.
NUT LOCK.
APPLICATION FILED JUNE 13, 1911.
1,022,336.
Patented Apr. 2, 1912.
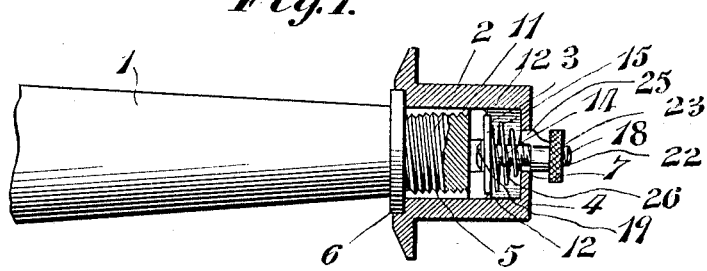
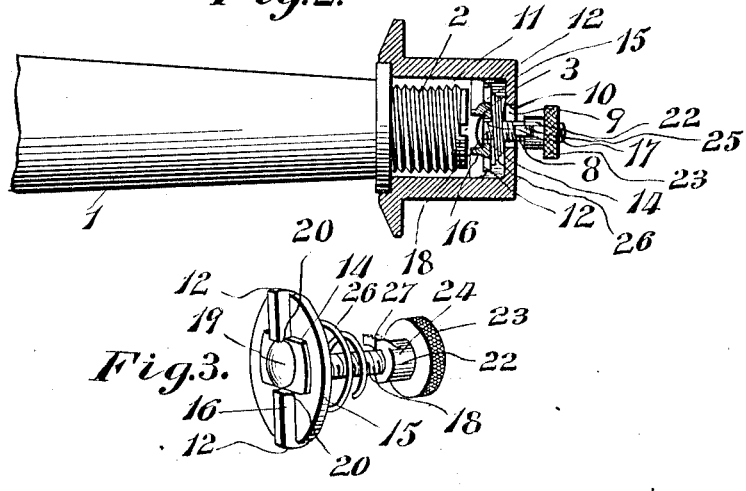
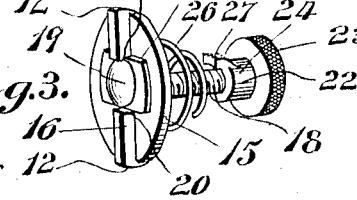
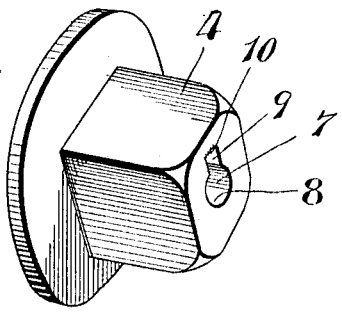
Witnesses
Thos. F. Knox,
John J. McCarthy.
Inventor
Clarence W. Shaw
By Victor J. Evans
Attorney

UNITED STATES PATENT OFFICE.

CLARENCE W. SHAW, OF JOHNSTONVILLE, CALIFORNIA.

NUT-LOCK.

1,022,336.   Specification of Letters Patent.   Patented Apr. 2, 1912.

Application filed June 13, 1911. Serial No. 632,931.

*To all whom it may concern:*

Be it known that I, CLARENCE W. SHAW, a citizen of the United States, residing at Johnstonville, in the county of Lassen and State of California, have invented new and useful Improvements in Nut-Locks, of which the following is a specification.

This invention relates to improvements in nut locks and has particular reference to devices for locking the nuts on vehicle spindles whereby the said nuts are prevented from turning off, and has for one of its objects to provide a device of this character which will be easy to manipulate, cheap to manufacture and efficient and positive in operation.

Another object of the present invention is to provide a locking device for nuts which is housed within a cap nut and resiliently held in locking engagement with the screw threaded nut receiving member.

A further object of the present invention is to provide a locking device, for securing the nuts upon the outer ends of spindles of vehicle axles, comprehending a locking plate adapted to be resiliently held in locking engagement with the spindle and locked to the nut, and means carried by the said locking plate whereby said plate may be disengaged from the spindle independently of the nut.

With the above and other objects in view the invention consists in the construction, combination and arrangement of parts hereinafter fully described and claimed and illustrated in the accompanying drawing, wherein the preferred embodiment of the invention is shown, and wherein:—

Figure 1 is a longitudinal sectional view through a spindle and nut illustrating the locking device in locked position. Fig. 2 is a longitudinal sectional view through a vehicle spindle and nut illustrating the locking device in unlocked position. Fig. 3 is a detail perspective view of the locking device, and Fig. 4 is a detached perspective view illustrating the parts in their relative positions.

Referring more particularly to the accompanying drawing, the numeral 1 designates the axle spindle, the outer end of which is circumferentially reduced to provide a screw threaded tenon 2, the end face of which is formed with grooves 3, preferably two in number and intersecting each other on the longitudinal central line of the tenon 2.

The nut designated by the numeral 4 is interiorly screw threaded as at 5 whereby to receive the tenon of the vehicle spindle 1 and is flanged on its surface next the vehicle spindle to receive the washer 6. The nut 4, which is a cap nut, has its end wall 5 formed with an opening 7 which is of irregular contour and is provided with a wall having a semi-circular end portion 8 and a rectangular portion 9, which is provided with centrally located serrations 10.

Formed interiorly of the nut and extending longitudinally thereof are a pair of diametrically opposed key-ways or grooves 11 adapted to receive the combined guiding and locking keys 12 of the locking device, designated in general by the numeral 14.
The locking device 14 preferably comprises a locking plate 15 having upstanding locking lugs 16 formed integral therewith, the said lugs 16 being adapted to enter the grooves 3 formed on the outer end of the tenon. The locking plate also has circumferentially off-set therefrom a pair of combined guiding and locking keys 12, these keys 12 being preferably extensions of the members 16, and formed integral with said members. The locking plate 15 has formed centrally thereof an opening 17 adapted to receive the screw threaded member 18. The member 18 is provided with a head 19 and is adapted to be rigidly secured to the locking plate, said head being adapted to snugly fit between the under-cut terminals 20 formed in the confronting ends of the locking keys 16. The free end of the threaded member 18 is adapted to receive the lock releasing nut 22. This nut 22 comprises a knurled head 23 circumferentially reduced as at 24 to enter the opening 7 of the nut 4.

Formed integral with the reduced portion 24 and off-set therefrom is, what I term a rest 25 the outer surface of which is serrated as at 27 to frictionally engage the serrations 10 formed in the end wall of the nut 4 for more securely holding the locking device, in its locking position, against accidental displacement. A spring 26, preferably a conical helical spring, is disposed within the nut and is adapted to encircle the screw threaded member 18 in the operative positions of the parts. This spring has one end in engagement with the end wall of the nut, and its other end engaging the inner face of the locking plate.

In the operative positions of the parts the locking device 14 is disposed within the nut and guided in longitudinal movement by means of the keys 12 engaging the grooves 11 and is also locked to the nut by said grooves and keys. The screw threaded member 18 being encircled by the spring 26 and projecting through the opening 7 formed in the end wall of the nut, is adapted to receive the lock releasing nut 22, which is interiorly screw threaded for this purpose. As illustrated in Fig. 1 of the drawing the rest 25 is disposed within the part 9 of the opening 7 in the end wall of the nut and the locking plate 15 is forced inward by the spring 26 causing the locking lugs 16 to engage the grooves 3 in the tenon 2 of the spindle 1 thereby locking said nut and spindle relatively to one another. From Fig. 2 of the drawing it will be manifest that, by exerting an outward pull on the lock releasing nut 22, the locking device 14 is withdrawn from the grooves 3 against the tension of the spring 26 thereby releasing the locking device and allowing the nut to be removed from the spindle. By giving the lock releasing nut 22, when in its outermost position, a half turn to the left or right the rest 25 engages the end wall of the nut thereby holding said locking device in its unlocked position.

I do not limit myself to the exact details of construction as herein set forth as various changes may be made within the scope of the claims and without departing from the spirit of the invention or sacrificing any of the advantages thereof.

Having thus described my invention what I claim and desire to secure by Letters Patent is:—

1. In combination, a threaded member, a nut threaded thereon, and provided with diametrically opposed longitudinal grooves, a locking device disposed within the nut, means for holding said device in locking engagement with the threaded member, keys carried by said locking device and engaging said longitudinal grooves, and means for moving said locking device longitudinally of the nut to disengage the same from the threaded member, said keys and grooves guiding said locking device in its longitudinal movement.

2. The combination with a member having a threaded end and provided with a transverse groove, of a locking device including a plate, means carried by said plate and adapted to engage the groove, a nut threaded on said member and housing said locking device and formed interiorly with longitudinal key-ways, keys carried by said plate and adapted to engage said key-ways, and means arranged exteriorly of the nut for moving the said locking device longitudinally of the nut and out of engagement with the groove, said keys and key-ways guiding said locking device in its longitudinal movement and preventing rotation of the device independently of the nut.

3. The combination with a member having a threaded end, said end being provided with a transversely disposed groove, of a locking device including a plate, key members formed on said plate and adapted to enter said groove, a nut adapted to fit the threaded end of said member and completely house said plate, means interposed between the head of said nut and the plate to hold the locking device in engagement with the member, said nut being formed interiorly with longitudinal keyways, keys carried by said plate and adapted to enter said keyways, and means for moving said plate longitudinally of said nut, said key-ways and keys forming the guiding means of said plate in its longitudinal movement.

In testimony whereof I affix my signature in presence of two witnesses.

CLARENCE W. SHAW.

Witnesses:
HARRY B. PEARCE,
W. H. SNYDER,

Copies of this patent may be obtained for five cents each, by addressing the "Commissioner of Patents, Washington, D. C."